(12) United States Patent
Zelis

(10) Patent No.: US 9,107,283 B2
(45) Date of Patent: Aug. 11, 2015

(54) METHOD FOR MAGNETIC CONTROL OF PLASMA ARC

(71) Applicant: Thermal Dynamics Corporation, West Lebanon, NH (US)

(72) Inventor: Pieter Willen Jozef Zelis, Sevenum (NL)

(73) Assignee: Victor Equipment Company, Denton, TX (US)

( * ) Notice: Subject to any disclaimer, the term of this patent is extended or adjusted under 35 U.S.C. 154(b) by 27 days.

(21) Appl. No.: 13/900,983

(22) Filed: May 23, 2013

(65) Prior Publication Data

US 2014/0151345 A1 Jun. 5, 2014

Related U.S. Application Data

(60) Provisional application No. 61/651,514, filed on May 24, 2012.

(51) Int. Cl.
*B23K 10/00* (2006.01)
*H05H 1/40* (2006.01)
*H05H 1/50* (2006.01)
*B23K 9/08* (2006.01)

(52) U.S. Cl.
CPC .. *H05H 1/40* (2013.01); *B23K 9/08* (2013.01); *B23K 10/006* (2013.01); *H05H 1/50* (2013.01)

(58) Field of Classification Search
CPC ............. H05H 1/40; H05H 1/50; H05H 1/26; B23K 9/08; B23K 10/006
USPC ................... 219/121.48, 121.54, 121.57, 123
See application file for complete search history.

(56) References Cited

U.S. PATENT DOCUMENTS

| | | | |
|---|---|---|---|
| 2,941,063 A | | 6/1960 | Ducati et al. |
| 4,169,962 A * | 10/1979 | Hiratake et al. ................. 373/18 |
| 4,194,106 A | | 3/1980 | Rudaz et al. |
| 5,043,554 A * | 8/1991 | Kohsaka et al. ......... 219/121.39 |
| 5,298,136 A * | 3/1994 | Ramalingam ............ 204/192.38 |
| 5,538,765 A * | 7/1996 | Kurihara et al. .............. 427/577 |
| 7,235,758 B2 * | 6/2007 | Ignatchenko et al. ........ 219/123 |
| 7,300,559 B2 * | 11/2007 | Gorokhovsky .......... 204/192.38 |
| 8,115,135 B2 * | 2/2012 | Kuo ......................... 219/121.48 |

FOREIGN PATENT DOCUMENTS

| | | |
|---|---|---|
| GB | 825677 | 12/1959 |
| GB | 971063 | 9/1964 |
| WO | 2007079650 | 7/2007 |

OTHER PUBLICATIONS

International Search Report; PCT/US2013/042412; (Oct. 15, 2013).

* cited by examiner

*Primary Examiner* — Mark Paschall
(74) *Attorney, Agent, or Firm* — Kacvinsky Daisak Bluni PLLC

(57) ABSTRACT

A device for controlling a plasma arc is provided that includes a plurality of magnetic poles disposed around a distal end portion of a plasma arc torch. A plurality of electrical coils are wound around a proximal end portion of each of the plurality of magnetic poles, and a plurality of lead wires are connected to the plurality of electrical coils. A control system for controlling a current supplied to the plasma arc torch through the lead wires is also provided that changes at least one of a strength of a magnetic field produced by the magnetic poles, a polarity of the magnetic poles, and a movement of a magnetic force between the plurality of magnetic poles, such that a size and location of the plasma arc is controlled.

20 Claims, 5 Drawing Sheets

METHOD FOR MAGNETIC CONTROL OF PLASMA ARC

CROSS-REFERENCE TO RELATED APPLICATIONS

This application claims the benefit of provisional application Ser. No. 61/651,514, filed on May 24, 2012. The disclosure of the above application is incorporated herein by reference.

FIELD

The present disclosure relates to plasma arc torches or devices, and in particular, alternate methods and systems to control a plasma arc of such plasma devices.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

A variety of devices and methods to control the plasma stream have been developed in order to improve cut quality and/or cut speed. Such methods include using a secondary gas that flows distally around the tip to stabilize the plasma stream. Shield caps that employ passageways to direct the secondary gas against/around the plasma stream are also known. Furthermore, a variety of current ramping techniques have been used, along with changing gas types and flow rates as a function of cutting parameters. Methods and devices to improve cut quality and cut speed are continuously desired in the art of plasma arc torches.

SUMMARY

In one form of the present disclosure, a device for controlling a plasma arc is provided that comprises a plurality of magnetic poles disposed around a distal end portion of a plasma arc torch, a plurality of electrical coils wound around a proximal end portion of each of the plurality of magnetic poles, and a plurality of lead wires connected to the plurality of electrical coils. A control system is also provided for controlling a current supplied to the plasma arc torch through the lead wires to change at least one of a strength of a magnetic field produced by the magnetic poles, a polarity of the magnetic poles, and a movement of a magnetic force between the plurality of magnetic poles, such that a size and location of the plasma arc is controlled.

In another form, a method of controlling a plasma arc is provided that comprises applying a current signal to a plurality of magnetic poles disposed around a plasma arc torch, controlling the current signal to change at least one of a strength of a magnetic field produced by the magnetic poles, a polarity of the magnetic poles, and a movement of a magnetic force between the plurality of magnetic poles, such that a size and location of the plasma arc is controlled.

In yet another form, a plasma arc torch is provided that comprises a torch head defining a proximal end portion and a distal end portion, a plurality of magnetic poles disposed around the distal end portion of the torch head, a plurality of electrical coils wound around a proximal end portion of each of the plurality of magnetic poles, and a plurality of lead wires connected to the plurality of electrical coils. A control system is also provided for controlling a current supplied to the plasma arc torch through the lead wires to change at least one of a strength of a magnetic field produced by the magnetic poles, a polarity of the magnetic poles, and a movement of a magnetic force between the plurality of magnetic poles, such that a size and location of a plasma arc is controlled.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
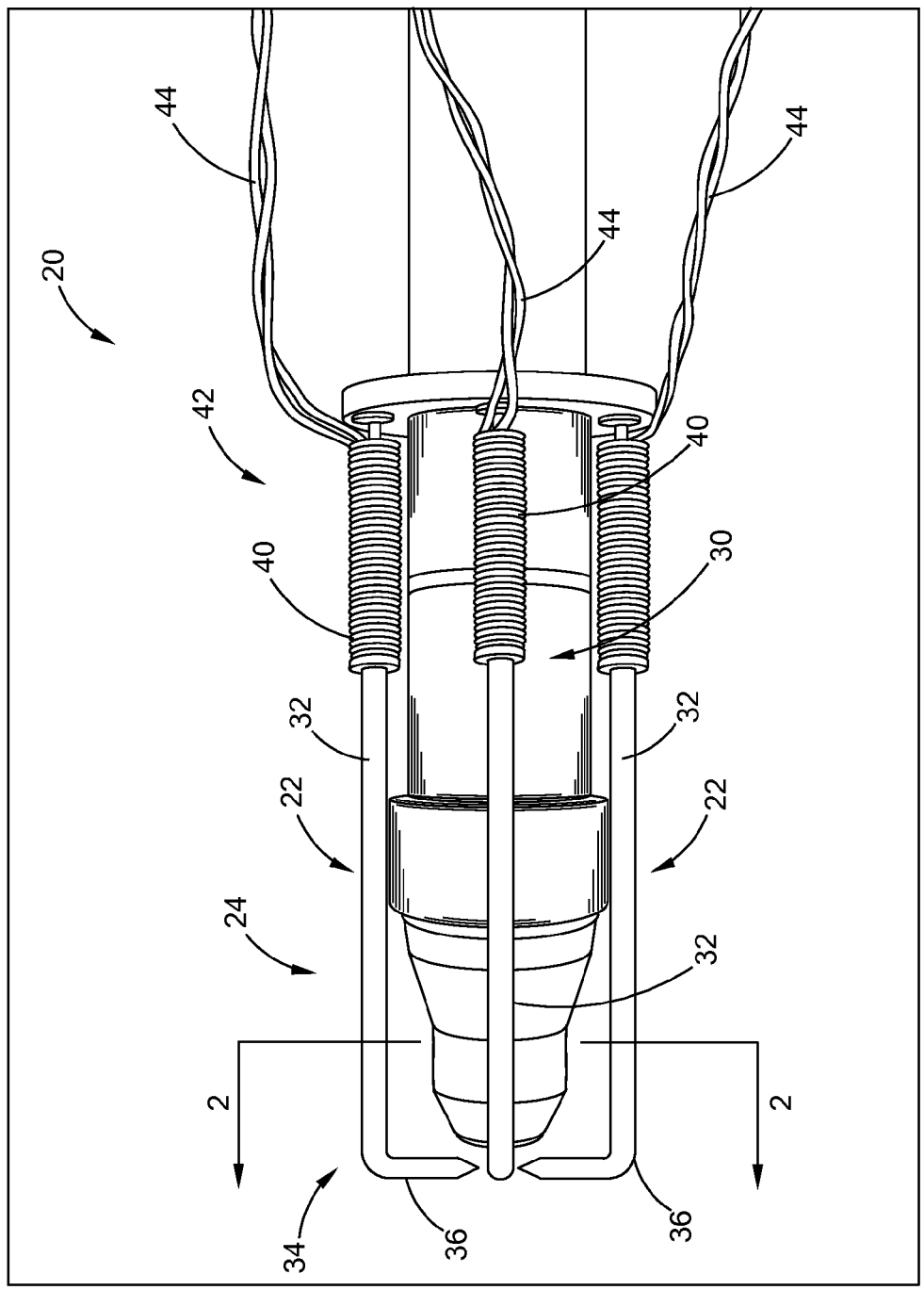
FIG. 1 is a perspective view of a device for controlling a plasma arc constructed in accordance with the principles of the present disclosure.

Referring to FIG. 1, a device for controlling a plasma arc is illustrated and generally indicated by reference numeral 20. The device 20 generally includes a plurality of magnetic poles 22 disposed around a distal end portion 24 of a plasma arc torch 30 as shown. The magnetic poles 22 define a body 32 extending axially along the plasma arc torch 30, each of the bodies 32 having a distal end 34 defining a radial projection 36, each of which extends inwardly towards the plasma arc.

Figure 2:
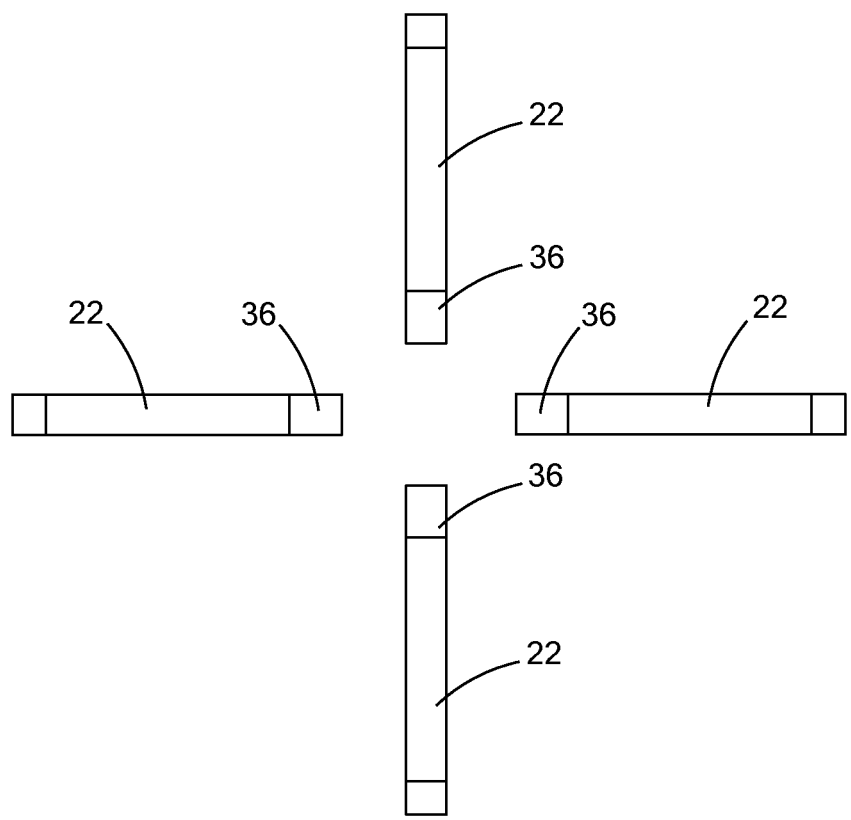
FIG. 2 is a cross-sectional view, taken along line 2-2 of FIG. 1, illustrating magnetic poles constructed in accordance with one form of the present disclosure.
Figure 3:
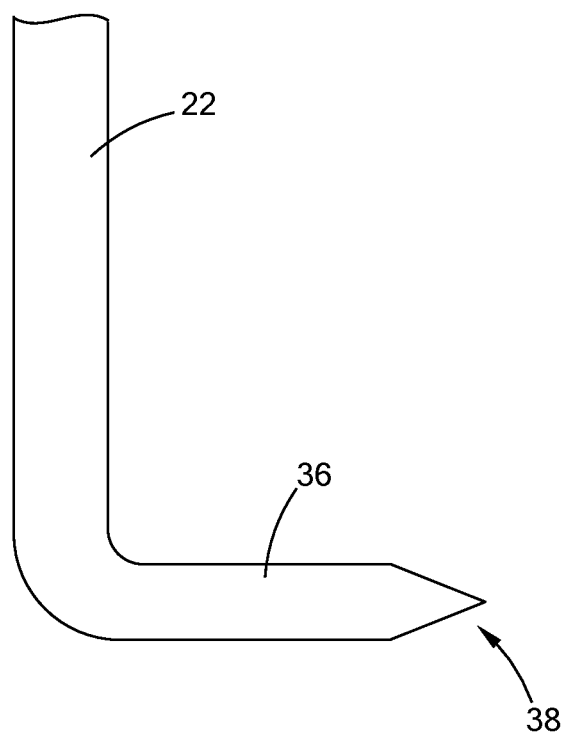
FIG. 3 is an enlarged side view of a radial projection of a magnetic pole constructed in accordance with one form of the present disclosure.

In this form, there are four (4) magnetic poles that are equally spaced, radially around the plasma arc torch 30, as shown in greater detail in FIG. 2. It should be understood that any number of magnetic poles may be employed, such as two (2) or six (6) or more, according to the principles of the present disclosure, and thus the illustration of four (4) is merely exemplary. Referring to FIG. 3, the projections 36 define a tapered end portion 38 in one form of the present disclosure. Additionally, the radial projections 36 lie in a common plane as shown. It should be understood, however, that the radial projections 36 may define a different geometry and lie in different planes while remaining within the scope of the present disclosure.

The magnetic poles 22 are illustrated as being disposed around the plasma arc torch 30, and more specifically, a torch head. However, it should be understood that the poles may be integrated inside the plasma arc torch 30 while remaining within the scope of the present disclosure. Accordingly, in the form shown, the device may be employed as a retrofit kit to adapt to current plasma arc torches, while other integrated devices can be designed as a new system.

As further shown in FIG. 1, a plurality of electrical coils 40 are wound around a proximal end portion 42 of each of the plurality of magnetic poles 22. A plurality of lead wires 44 are connected to the plurality of electrical coils 40, and current is supplied to the plasma arc torch 30 through the lead wires 44 to change the strength of a magnetic field produced by the magnetic poles 22, a polarity of the magnetic poles 22, and/or a movement of a magnetic force between the plurality of magnetic poles, to increase constriction of the plasma arc, the plasma arc root footprint, and the plasma arc root movement. Accordingly, the size and location of the plasma arc may be controlled by a magnetic field.

Figure 4:
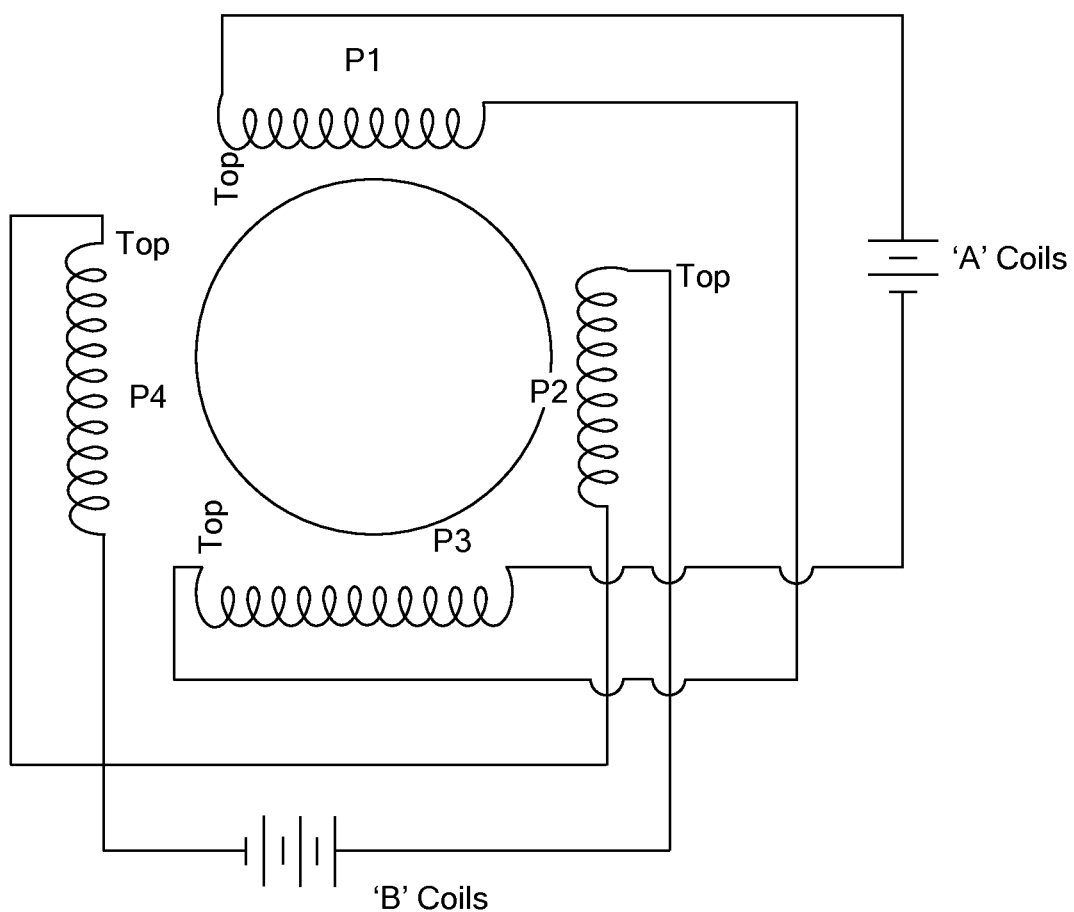
FIG. 4 is an electrical schematic of a circuit diagram for the magnetic poles in accordance with one form of the present disclosure.
Figure 5:
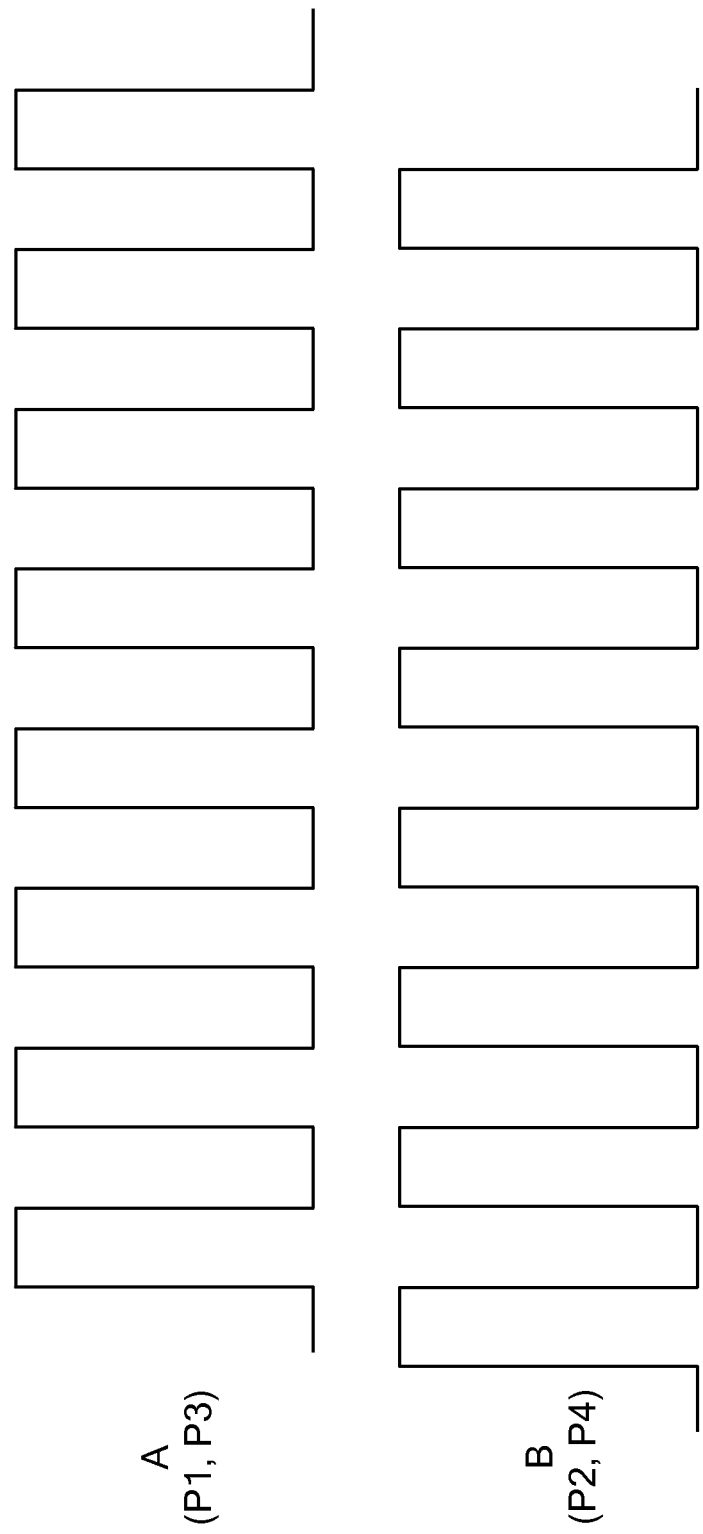
FIG. 5 is a schematic of one form of DC current waveforms supplied to the magnetic poles in accordance with the teachings of the present disclosure.

To accomplish such control of the magnetics, a control system is employed to control both the current strength and the current waveform. An exemplary system is shown in FIG. 4 with a circuit diagram corresponding to the four (4) magnetic poles 22, and in FIG. 5 with corresponding DC current waveforms. As shown in FIG. 5, the phases of the current waveform are offset 180 degrees from one magnetic pole to an adjacent magnetic pole, (poles are designated as P1, P2, P3, and P4), in one form of the present disclosure. It is also contemplated that pairs of magnetic poles 22 may be selectively energized in order to more precisely control the plasma arc, which is accomplished by the control system. More specifically, an inverter-based power supply with a stepper motor is used in one form of the present disclosure. The power supply produces a signal wherein the frequency of the current waveform controls a rotating magnetic field. The power supplied to each pole is switched from north to south, and the poles P1 and P3 are in series, while the poles P2 and P4 are in series. As the power is switched to each of the poles that are in series, a rotating magnetic field results. In one form, the power is switched at about 15 kHz, however, power can be switched as low as about 2 kHz while remaining within the scope of the present disclosure. In one form, the current magnitude can be about 5-10 amps, however other current levels may also be employed while remaining within the scope of the present disclosure. It is also contemplated that a modulated DC power signal, among other forms of current waveforms, is employed in accordance with another form of the present disclosure.

The magnetic poles 22 in one form are an iron steel, however, it should be understood that any ferromagnetic material may be employed while remaining within the scope of the present disclosure. Additionally, the number of windings for the electrical coils 40 is about 6-10 turns per inch for a 100 amp torch. It should be understood that the number of windings may be higher or lower and vary according to other amperages and other operating parameters while remaining within the scope of the present disclosure. For example, smaller coils may be employed with lower amperages. Accordingly, the values of windings and amperages set forth herein are merely exemplary and should not be construed as limiting the scope of the present disclosure.

It should be noted that the disclosure is not limited to the embodiments described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A device for controlling a plasma arc comprising:
   a plurality of magnetic poles disposed around a distal end portion of a plasma arc torch, the plurality of magnetic poles including a first group of magnetic poles having two or more magnetic poles electrically connected in a first series and a second group of magnetic poles having two or more magnetic poles electrically connected in a second series different than the first series;
   a plurality of electrical coils wound around a proximal end portion of each of the plurality of magnetic poles;
   a plurality of lead wires connected to the plurality of electrical coils; and
   a control system for controlling a current supplied to the plasma arc torch through the lead wires to change at least one of: a strength of a magnetic field produced by the magnetic poles, a polarity of the magnetic poles, and a movement of a magnetic force between the plurality of magnetic poles, such that a size and location of the plasma arc is controlled, and wherein the control system is configured to individually energize the first and second groups of magnetic poles.

2. The device according to claim 1, wherein at least one of a current strength and a current waveform are controlled.

3. The device according to claim 1 further comprising four magnetic poles spaced radially and evenly around the distal end portion of the plasma arc torch.

4. The device according to claim 1, wherein each of the magnetic poles define a body extending axially along the plasma arc torch, the body having a distal end defining a radial projection, the radial projection extending inwardly towards the plasma arc.

5. The device according to claim 4, wherein the projection defines a tapered geometry.

6. The device according to claim 4, wherein the radial projections of the magnetic poles lie in a common plane.

7. The device according to claim 1, wherein the magnetic poles are disposed around an exterior of the plasma arc torch.

8. The device according to claim 1, wherein the magnetic poles are disposed around an interior of the plasma arc torch.

9. The device according to claim 1, wherein the magnetic poles comprise an iron steel.

10. The device according to claim 1, wherein the electrical coils define approximately six to approximately ten windings per inch.

11. A method of controlling a plasma arc comprising:
    applying a current signal to a plurality of magnetic poles disposed around a plasma arc torch, the plurality of magnetic poles including a first group of magnetic poles having two or more magnetic poles electrically connected in a first series and a second group of magnetic poles having two or more magnetic poles electrically connected in a second series different than the first series;

controlling the current signal to individually energize and change, for each of the first and second groups of magnetic poles, at least one of: a strength of a magnetic field produced by the magnetic poles, a polarity of the magnetic poles, and a movement of a magnetic force between the plurality of magnetic poles, such that a size and location of the plasma arc is controlled.

12. The method according to claim 11, wherein at least one of a current strength and a current waveform are controlled.

13. The method according to claim 12, wherein the current waveform comprises modulated DC waveforms offset 180 degrees from one magnetic pole to an adjacent magnetic pole.

14. The method according to claim 11, wherein the plurality of magnetic poles are selectively energized.

15. A plasma arc torch comprising:
a torch head defining a proximal end portion and a distal end portion;
a plurality of magnetic poles disposed around the distal end portion of the torch head, the plurality of magnetic poles including a first group of magnetic poles having two or more magnetic poles electrically connected in a first series and a second group of magnetic poles having two or more magnetic poles electrically connected in a second series different than the first series;
a plurality of electrical coils wound around a proximal end portion of each of the plurality of magnetic poles;
a plurality of lead wires connected to the plurality of electrical coils; and
a control system for controlling a current supplied to the plasma arc torch through the lead wires to change at least one of: a strength of a magnetic field produced by the magnetic poles, a polarity of the magnetic poles, and a movement of a magnetic force between the plurality of magnetic poles, such that a size and location of a plasma arc is controlled, and wherein the control system is configured to individually energize the first and second groups of magnetic poles.

16. The device according to claim 15, wherein each of the magnetic poles define a body extending axially along the plasma arc torch, the body having a distal end defining a radial projection, the radial projection extending inwardly towards the plasma arc.

17. The device according to claim 16, wherein the projection defines a tapered geometry.

18. The device according to claim 16, wherein the radial projections of the magnetic poles lie in a common plane.

19. The device according to claim 15, wherein the magnetic poles are disposed around an exterior of the torch head.

20. The device according to claim 15, wherein the magnetic poles are disposed around an interior of the torch head.

* * * * *